United States Patent [19]

Hoffmann

[11] Patent Number: 5,533,738
[45] Date of Patent: Jul. 9, 1996

[54] PRESSURE CONTROLLED APPARATUS FOR SEALING SHUTOFF DEVICES LOCATED IN PIPELINES

[75] Inventor: Michael Hoffmann, Berlin, Germany

[73] Assignee: Borsig Kugelhahn GmbH, Germany

[21] Appl. No.: 497,151

[22] Filed: Jun. 30, 1995

[30] Foreign Application Priority Data

Jul. 1, 1994 [DE] Germany ............ 44 23 801.0

[51] Int. Cl.⁶ .............. F16J 15/46; F16K 15/06
[52] U.S. Cl. .............. 277/27; 277/73; 277/103; 277/175; 251/172; 251/174
[58] Field of Search .............. 277/27, 73, 76, 277/77, 100, 103, 175, 176; 251/161, 172, 174

[56] References Cited

U.S. PATENT DOCUMENTS

| | | | |
|---|---|---|---|
| 3,421,733 | 1/1969 | Stewart, Jr. | 251/174 |
| 3,565,392 | 2/1971 | Bryant | 251/172 |
| 3,617,025 | 11/1971 | Gerbic | 251/172 |
| 3,912,220 | 10/1975 | Vasicek et al. | 251/172 |
| 4,083,376 | 4/1978 | Alaniz | 251/172 |
| 4,226,258 | 10/1980 | Nakanishi | 251/172 |
| 4,292,989 | 10/1981 | Cazzaniga et al. | 251/174 |
| 4,332,267 | 6/1982 | Evans | 251/174 |
| 4,505,294 | 3/1985 | Walter | 251/174 |
| 4,566,482 | 1/1986 | Stunkard | 251/174 |
| 4,602,762 | 7/1986 | Koch et al. | 251/172 |

FOREIGN PATENT DOCUMENTS

2938265  4/1981  Germany .

*Primary Examiner*—Scott W. Cummings
*Attorney, Agent, or Firm*—Young & Basile

[57] ABSTRACT

An apparatus for sealing shut-off devices located in gas or liquid transporting pipelines having a sealing arrangement, which seals the shut-off device against a casing, the sealing arrangement having a gasket engageable against the circumferential surface of the shut-off device, a seating ring supporting the gasket, two chambers which can be supplied in a controlled manner with a pressure medium, and a method by which the gasket can be raised from the circumferential surface and pressed against the circumferential surface. The sealing arrangement has a driving member positively connected to the seating ring and a displaceable intermediate piston located on the driving member. The first chamber is located between the driving member and the intermediate piston and when subject to the action of the controlled pressure, brings about a movement of the driving member in the gasket raising direction. A second chamber located between the intermediate piston and the casing, when subject to the action of the controlled pressure, brings about a movement of the intermediate piston in the pressing direction. Between the seating ring and the intermediate piston are positioned spring elements which are biased in the pressing direction.

9 Claims, 2 Drawing Sheets

PRESSURE CONTROLLED APPARATUS FOR SEALING SHUTOFF DEVICES LOCATED IN PIPELINES

BACKGROUND OF THE INVENTION

The invention relates to an apparatus for sealing shut-off devices located in pipelines for transporting liquids and gases, and in particular, a plug for a ball valve.

Ball valves used in pipeline construction have a casing insertable into the pipeline and a spherical plug rotatable about an axis in the casing forming the shut-off device. The plug is sealable against the casing by seals pressing against the circumferential surface of the plug.

Sealing ring systems mounted in a floating manner in which a gasket, for example of Teflon, is clipped in a seating ring and projects, and O-rings or the like sealing the seating ring system with respect to the casing are known. Spring elements are positioned between the seating ring and the casing, and by a permanent pressing action, ensures the necessary surface pressure between the plug and the gasket. The seating ring surfaces exposed to the pipeline pressure are so dimensioned that as a result of the pipeline pressure acting on the surfaces, there is a pressure-dependent sealing force which, together with the spring tension, forms the overall sealing force acting on the gasket. These known seating rings act in a self-relieving manner (double block and bleed), that upon exceeding the permitted casing internal pressure, the seating rings are briefly raised from the spherical plug so that there is a pressure compensation to the pipeline.

There are known problems with double-acting seating ring systems (double piston) because the seating rings also seal on the outflow side, so that without additional units, a self-relief is impossible.

These known systems suffer from the disadvantage that the seating ring is not raised or relieved prior to the switching or operation of the spherical plug. This causes the thrust collar to scrape on the circumferential surface increasing the wear and thus reducing the life of both the plug and the seating ring system. In addition, the seating ring system can only be pressed onto the spherical plug as a function of the predetermined differential pressure surfaces and the spring tension. DE 29 38 265 A1 discloses a regulatable system for the contact pressure of seals in ball valves in which the seating ring carrying the gasket or packing is constructed as a piston with a central flange. Two chambers are formed between the casing and the flange surface into which a pressure medium can be introduced. As a function of the pressure acting on the particular flange surface, the seating ring is pressed against the circumferential surface of the spherical plug or is raised therefrom. However, such a system no longer functions if the pressure medium regulation or control system fails, for example in the case of a fire.

SUMMARY OF THE INVENTION

The object of the invention is to provide an apparatus for sealing shut-off devices located in pipelines for transporting liquids or gases which initially satisfies the standard requirements of the medium pressure-dependent sealing, double block and bleed or double piston; has a simple construction, and in the case of the sealing arrangement, as desired, can be pressed onto or raised from the shut-off device. Further, in the case of a failure of the pressure medium control or regulating system used in the apparatus, a completely satisfactory operation with respect to the sealing action is ensured.

By means of the pressure control, the driving member raises the seating ring prior to the switching of the shut-off device. During switching, the thrust ring no longer scrapes on the circumferential surface and consequently, the service life of both the thrust ring and the shut-off device is increased. By the provision of the controlled pressurization of the intermediate piston, if necessary, the contact pressure of the gasket on the circumferential surface can be increased. In the case of a failure of the pressure control, for example through an interruption or break of the pressure line, the sealing arrangement operates independently of the pressure control or regulating system and the contact pressure is brought about by the spring positioned between the seating ring and the intermediate piston. At a maximum, two bores are required to the outside for the pressure control.

As a result of the measures hereinafter, further developments and improvements are possible. The sealing arrangement according to the invention is also usable for seating ring systems, which seal on the pressure-remote side.

As a result of the presence of the driving member, which serves as a stop, seating ring sagging during the switching process can be limited. By the provision of a removable stop element, the sealing arrangement can be moved away from the center of the cock, which is necessary for the fitting or dismantling of so-called top entry bore valves or cocks.

BRIEF DESCRIPTION OF THE DRAWINGS

Embodiments of the invention are described in greater detail hereinafter relative to the attached drawings, wherein.

DETAILED DESCRIPTION OF THE PREFERRED EMBODIMENT

Figure 1:
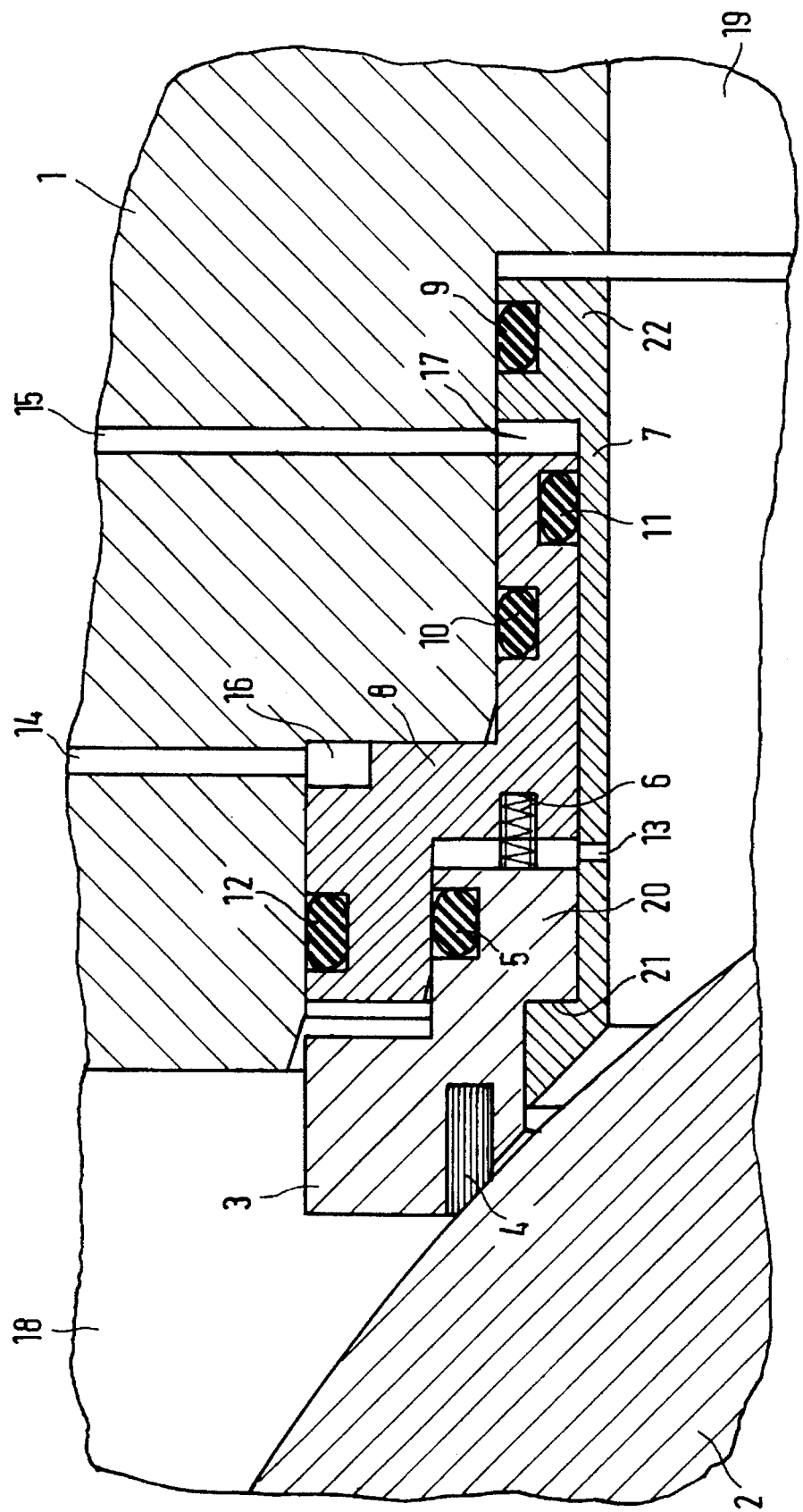
FIG. 1 is a partial section through a first embodiment of the invention with a self-relieving sealing arrangement.

The ball valve in FIG. 1, shown in longitudinal partial sectional form, has a casing 1 receiving a spherical plug 2, which is rotatable in the casing 1 about an axis perpendicular to the flow direction. A sealing arrangement 20 seals the spherical plug 2 against the casing 1. The sealing arrangement 20 consists of a seating ring 3 supporting a gasket or packing 4, a sleeve-like, elongated driving member 7 and an intermediate piston 8 located between the seating ring 3 and the driving member 7. At the end facing the plug, the driving member 7 is provided with a step 21, which engages a corresponding depression of the seating ring 3, so that the corresponding shoulders of the seating ring 3 and the step 21 of the driving member 7 form a positive connection. The opposing end of the driving member remote from the plug 2 is constructed as a flange 22, which slides with its lateral faces in the casing 1, so that there is an adequate spacing between the front face of the flange 22 and the casing 1. The flange is sealed against the casing by means of an O-ring seal 9.

The intermediate piston 8 is constructed as a differential piston and is arranged on one side between the casing and the sleeve-like part of the driving member 7 and between the casing 1 and the seating ring 3, the seating ring 3, driving member 7 and intermediate piston 8 being displaceable relative to one another. The seating ring 3 is sealed against the intermediate piston 8 by means of an O-ring seal 5, with respect to the casing 1 with an O-ring 12. The intermediate piston 8 is sealed against the casing 1 and the driving member 7 by O-rings 10 and 11 respectively.

The intermediate piston 8 has several depressions in which are located spring elements 6, which are supported against a front face of the seating ring 3 opposite from the plug 2 and which exert a biasing force in the pressing direction of the gasket 4. The driving member 7, in the area of the gap between the seating ring 3 and the intermediate piston 8, are provided numerous connecting bores 13 by means of which the gap is connected to the line 19.

Between the front faces of the intermediate piston 8, opposite from the plug 2 and the casing 1, and the flange 22 of the driving member 7 are provided chambers 16 and 17 respectively, which are in each case connected by bores 14, 15 respectively, and a control with a pressure medium source, not shown.

As shown in FIG. 1, if no pressure medium is supplied to the bores 14, 15, for example if ambient pressure prevails in the chambers 16, 17 and in the line 19 is present the pressure of the medium to be transported, the gasket 4 as a result of the corresponding spring tension of the spring elements 6 is pressed against the circumferential surface of the plug 2, and in addition, a differential pressure acts on the gasket 4, which is brought about due to the pressure of the medium in the line 19 acting on the faces of the sealing arrangement. For example, this additional compressive force is determined by the differential pressure surface between the external diameter of the O-ring 5 and the internal diameter of the gasket 4. If the pressure in the inner space 18 is too high, the pressure acting on the faces of the seating ring 3 causes seating ring 3 to rise and there can be a pressure compensation to the line 19.

If a higher contact pressure of the gasket 4 is desired, then by means of the bore 14, the pressure medium is passed at a higher pressure into the chamber 16 so that the intermediate piston 8 is displaced towards the plug 2 and the spring elements 6 are compressed. Independent of the level of pressure in the chamber 16, it is consequently possible to control the contact pressure of the packing 4.

If the plug 2 is switched about the axis perpendicular to the flow direction, the gasket 4 should be raised during the switching time and for this purpose, the pressure medium is passed via the bore 15 into the chamber 17 so that through the pressure of the pressure medium acting on the surface of the flange 22 facing the intermediate piston 8, counter to the spring tension of the spring elements 6 and the pressure acting on the differential faces of the medium flowing in the line 19, the driving member 7 is displaced towards the casing 1, the seating ring 3 being raised from the plug 2 due to the positive connection at the step 21 with the gasket 4. It is now possible to switch or operate the plug 2 and, at the end of the switching or operating process, the pressure in the chamber 17 is replaced by ambient pressure, so that the spring elements 6 bring the seating ring 3 with the gasket 4 back into the sealing position.

In the case of large ball valve dimensions, there is an increased risk of seating ring sag due to the intermediate positioning during the switching process. As a result of the sag, there is locally a high edge pressure through the edge between the opening and the circumferential surface of the plug. In the present invention, the driving member 7 serves as a stop for limiting sagging.

Figure 2:
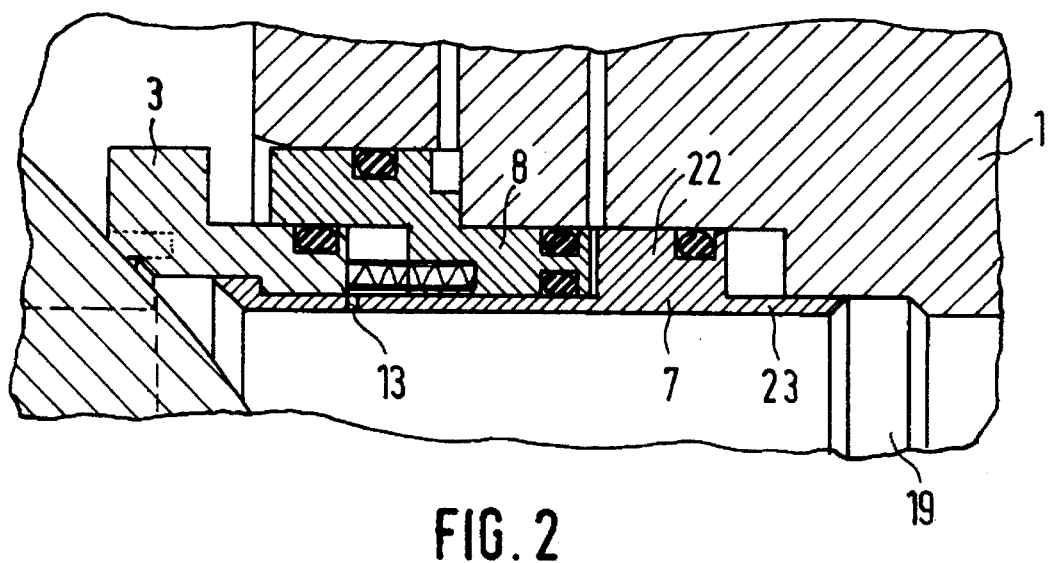
FIG. 2 is a partial section through a second embodiment of the invention with a self-relieving sealing arrangement.

FIG. 2 shows an alternative embodiment which differs from that of FIG. 1 only through the shape of the driving member 7. The driving member does not terminate with the flange 22, but rather includes a shoulder 23 with a diameter decreased towards the flange which slides in the casing 1 and seals the gap present between the flange and the casing towards line 19. Thus, little or no deposition of matter can take place in the gap. The pressure of the medium flowing through the line acts on the front face of the seating ring 3 due to the connecting bores 13.

Figure 3:
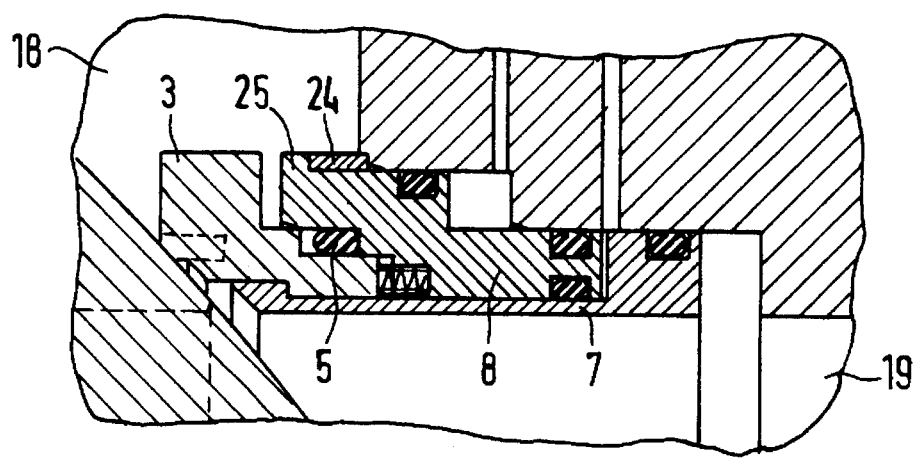
FIG. 3 is a partial section through a third embodiment of the invention with a double-sealing sealing arrangement.

FIG. 3 shows an alternative embodiment acting in a double-sealing manner. The intermediate piston 8 and the seating ring 3 have a somewhat different construction. The seal 5 positioned between the intermediate piston 8 and the seating ring 3 serves as an additional piston face and, as a function of the pressure conditions, is supported against the intermediate piston 8 and against the seating ring 3, so that corresponding forces ar transferred. The differential pressure surface for the sealing of the inner space 18 is determined by the difference between the internal diameter of the Oring seal 5 and the external diameter of the gasket 4. The line 19 is sealed by the spring tension of the spring 6 and the differential pressure face defined by the external diameter of the seal 5 and the internal diameter of the gasket 4.

In addition, FIG. 3 shows the intermediate piston 8 is not directly supported on the casing 1, but rather by a stop ring 24 on the outer face of the intermediate piston 8. The stop ring is, for example, constructed as a split body ring and the intermediate piston has a shoulder 25 which engages the ring 24 without pressurizing the chamber 16. This embodiment is provided for top entry ball valves where repairs in the pipeline take place by retracting the sealing arrangement and removing the plug 2 from above. In this case, the stop ring 24 is removed so that the seating ring can be lifted to a significant extent.

The invention has been described relative to a ball valve. However, the apparatus according to the invention can also be used in slip ring seals in turbine casings, in slide valves, control cocks or valves for hydraulic/pneumatic gap regulation and therefore, for flow regulation and the like.

For regulating the flow quantities via the inner space 18 in the case of a closed or partly opened shut-off device, the pressure of the pressure medium towards the chambers is regulated in such a way that there are different displacement paths of the seating ring and consequently different gap widths between the gasket and the shut-off device.

What is claimed is:

1. An apparatus for sealing shut-off devices located in pipelines for transporting liquids or gases comprising: a sealing arrangement for sealing the shut-off device against a casing, the sealing arrangement having a gasket engageable against a circumferential surface of the shut-off device, a seating ring supporting the gasket, a first and a second chamber in connecting relationship with a controllable pressure medium allowing the gasket to be selectively raised from the circumferential surface and forced against the circumferential surface, the sealing arrangement having a driving member positively connected to the seating ring, an intermediate piston displaceably positioned adjacent the driving member, the first chamber positioned between the driving member and the intermediate piston, the second chamber positioned between the intermediate piston and the casing, and spring elements positioned between the seating ring and the intermediate piston biased in the pressing direction.

2. The apparatus according to claim 1, wherein the driving member is an elongated sleeve with a shoulder formed in an area facing the shut-off device, the shoulder forming the positive connection with the seating ring, the driving member further having a flange on an area remote from the shut-off device, the first chamber is defined by a front face of the intermediate piston and a face of the flange.

3. The apparatus according to claim 2, wherein the flange of the driving member is connected to a shoulder having a smaller diameter than the external diameter of the flange, the flange engages a line and seals a gap between front face of the flange and the casing.

4. The apparatus according to claim 1, wherein a removable element is positioned in the casing, the removable element serving as a stop against movement of the intermediate piston in the raising direction, removal of the removable element allows further displacement of the intermediate piston in the raising direction.

5. The apparatus according to claim 4, wherein the removable element is a once slotted ring.

6. The apparatus according to claim 3, wherein the pressure medium in the first and the second chamber is selectively regulated as a function of the desired flow quantities between the line and an inner space.

7. The apparatus according to claim 2, wherein a removable element is positioned in the casing, the removable element serving as a stop against movement of the intermediate piston in the raising direction, removal of the removable element allows further displacement of the intermediate piston in the raising direction.

8. The apparatus according to claim 7, wherein the removable element is a once slotted ring.

9. The apparatus according to claim 8, wherein the pressure medium in the first and the second chamber is regulated as a function of the desired flow quantities between the line and an inner space.

* * * * *